Oct. 8, 1963   R. WALLBAUM ET AL   3,106,161
DETONATOR ARRANGEMENT
Filed Nov. 16, 1960

United States Patent Office 3,106,161
Patented Oct. 8, 1963

3,106,161
DETONATOR ARRANGEMENT
Rudolf Wallbaum and Wilhelm Mangel, Haltern, Westphalia, Hermann Frank, Dulmen, Westphalia, and Günther Kaminski, Waltrop, Westphalia, Germany, assignors to Wasag-Chemie A.G., Essen, Germany
Filed Nov. 16, 1960, Ser. No. 69,605
Claims priority, application Germany Nov. 18, 1959
6 Claims. (Cl. 102—70.2)

The present invention concerns a detonator arrangement, particularly designed for being used in projectiles and other missiles and capable of being ignited by the application of electric energy.

The ignition of detonators in projectiles and other missiles by electrical means entails substantial difficulties. In order to overcome these difficulties a substantial number of arrangements have been proposed in the past which deal particularly with the means for generating the igniting current. However, the known devices of this kind are comparatively complicated and involved and suffer from a remarkable tendency to fail in their mechanical or electrical functions.

It is therefore a main object of the present invention to overcome these difficulties and to provide for a detonator arrangement which is capable of withstanding even the roughest handling and which is yet a comparatively very simple arrangement.

In the prior art electrical rapid action detonators have been developed for various purposes, these detonators being capable, upon application of very small ignition energies of the order of $10^{-3}$ watt seconds and less, of initiating or igniting an explosive or other ignitable material or compound within a time period ranging between $10^{-5}$ to $10^{-6}$ seconds. If detonators of this delicate nature are to be carried by shells, projectiles or other missiles, then the selection of a suitable current generator capable of a precisely timed and quick-acting ignition constitutes a serious problem.

It is possible to utilize for solving this problem and for generating the igniting current those piezoelectric ceramic materials which have been used also for producing the voltages required in high frequency spark photography, as for instance barium titanate. The exceptional dielectric properties of this group of piezoelectric materials, and particularly of piezoelectric ceramic materials, as the above mentioned barium titanate, lead titanate etc., are well known. Reference is made to U.S. Pat. 2,892,411 and to the following publications: H. Sachse: "Ferroelektrika," published by Springer-Verlag, Berlin, 1956; catalogue "Keramik-Schwinger" published by Rosenthal-Isolatoren G.m.b.H., Selb (Bavaria), July 1960.

Tablets or other elements made from this material are commercially available, e.g. under the trade name Rosalt-S 1. For instance, a tablet of sintered barium titanate, subsequently polarized by application of a field of direct current voltage, may have a normal dielectric constant of between 1500 and 1800. Upon sudden application of a pressure pulse the tablet produces a charge across its terminals rising to a voltage of several kilovolts to proportion to the increase of the applied pressure. Usually, the terminals of the tablet consist of a metallic layer applied to opposite surfaces thereof. If now these terminals are connected in parallel with a high-resistance sensitive electro-responsive detonator the latter will be ignited by the energy derived from the above mentioned high-voltage charge of the piezoelectric tablet.

However, it has been found that in such a simple arrangement only very high-resistance and very sensitive electroresponsive detonators can be used because detonators having a low resistance and calling therefore for a comparatively high amperage for their ignition would not respond by being ignited. On the other hand, high-resistance detonators offer very little safety against rough handling so that they appear to be not well suited for being used for the above mentioned purposes.

It is therefore a further object of the invention to provide for a detonator arrangement in which electroresponsive detonators can be used which have a comparatively low resistance.

With the above objects in view, in a detonator arrangement responsive to the impact of a moving mass, the invention provides, in combination, piezoelectric means arranged to be exposed to the impact of a movable mass and capable of generating a charge of high voltage available at the terminals of said means in response to such impact; low-resistance electroresponsive detonator means ignitable by a current of predetermined amperage; and circuit means connected between said terminals of said piezoelectric means and said detonator means and including impulse control means capable of deriving from said high voltage charge a comparatively brief electrical impulse of at least said predetermined amperage so as to cause said detonator means to ignite.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

Figure 1:
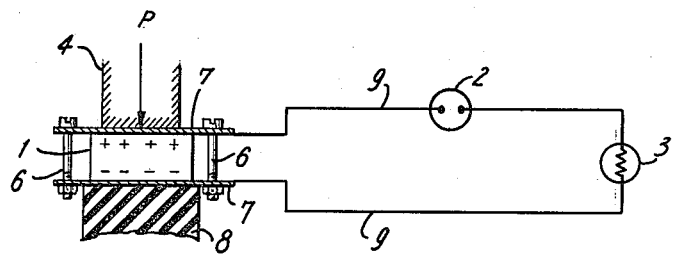
FIG. 1 is a schematic diagram illustrating one embodiment of the invention.
Figure 2:
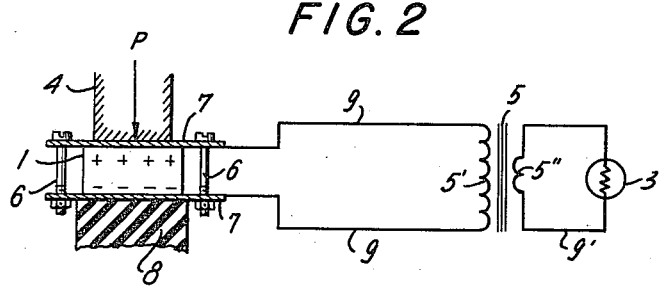
FIG. 2 is another schematic diagram illustrating a second embodiment of the invention.
Figure 3:
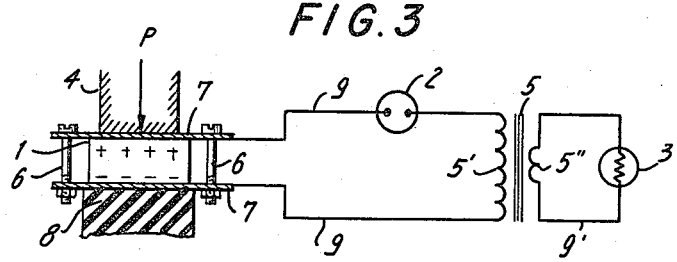
FIG. 3 is a schematic diagram illustrating a further embodiment of the invention incorporating the features of FIGS. 1 and 2.

Referring to FIGS. 1–3, a tablet 1 of polarized piezoelectric material, e.g. of barium titanate is held between support plates 7 and supported by insulating or insulated material 8. By means of screws 6 connecting the plates 7 the tablet 1 may be subjected to a predetermined amount of prestressing for pre-adjusting the sensitivity of the tablet to the impact of a mass 4 whereby an immediate and very steep increase of pressure or stress in the tablet under the impact P of the mass 4 is obtained. The tablet 1 has at its upper and lower face, as seen in FIGS. 1–3, a metallic layer applied thereto, e.g. by vapor deposit of silver or another suitable metal. Thus the plates 7 are in conductive contact with the tablet 1 and are connected with an outside igniting circuit 9.

In the embodiment according to FIG. 1 the outside circuit 9 contains an electroresponsive detonator 3 containing an igniting resistor of comparatively low resistance and, in series therewith, a spark gap device 2. The spark gap means may be a conventional spark tube having two electrodes and being filled with a noble gas. Whenever the mass 4 is caused to strike in the direction of arrow P, the tablet 1 is subjected to a steep pressure pulse. Consequently, a very rapid increase of potential available at the plates 7 is effected but the resulting high-voltage charge will be released across the spark gap device 2 only after the high-voltage charge of the tablet 1 has reached the predetermined characteristic sparkover voltage of the spark gap device 2. The moment this occurs a strong electric impulse is applied to the detonator 3 whereby the latter is rapidly and vigorously ignited.

Referring now to FIG. 2, the outer circuit 9 comprises the primary winding of an impulse transformer 5. This primary winding 5' is constructed to have a high resistance in the frequency range of the above mentioned pulse resulting from the brief voltage pulse generated by the mechanical impact of the mass 4. Thus, the high-voltage charge produced in the tablet 1 will be able to discharge accordingly across the primary winding 5'. The ratio between the primary winding 5' and the secondary winding 5" is such that the input voltage of the transformer 5 is substantially stepped down so that the amperage in the secondary circuit 9' is accordingly increased. The leading flank of the output pulse furnished by the transformer 5 is similar to that of the primary impulse applied to the winding 5', however the remaining shape of the output pulse in terms of time and potential can be determined easily by well known means, namely by selecting suitable parameters, to suit the ignition characteristics of the low-resistance detonator 3 whereby a safe, reliable and rapid ignition of the latter is achieved.

Referring now to FIG. 3, it can be seen that this embodiment constitutes a combination of the characteristic features of the embodiments of FIGS. 1 and 2. Hereby a still better operation of the arrangement is obtained. In the same manner as described above the impact of the mass 4 on the tablet 1 generates a high-voltage charge which rises until its voltage reaches at least the sparkover voltage of the spark gap device 2 whereafter the charge is released across the primary winding 5' of the transformer 5 so that the secondary impulse furnished by the secondary winding 5" in the secondary circuit 9' causes the ignition of the detonator 3.

It should be understood that the above described embodiments are only examples and that certain elements thereof could easily be replaced by other elements provided the same operation is obtained thereby.

As an example, entirely satisfactory results have been obtained through experiments in an arrangement of the following specifications.

The tablet 1 was a commercially available barium titanate pill having terminal layers of vapor deposited silver. The modulus of elasticity was between $.8 \cdot 10^6$ to $1.1 \cdot 10^6$ kg./cm.$^2$. The density of the material was about 5.6 g./cm.$^2$. The material is suitable for operation in a temperature range between about $-50°$ C. and $100°$ C. The dielectric constant at $20°$ C. was about 1200. The dielectric resistance was about 7,500 ohms upon application of 100 volts D.C. voltage. The piezoelectric coefficient was approximately $6.3 \cdot 10^{-15}$ coulomb/dyne=$6.5 \cdot 10^{-14}$ cb./kg.

The mass 4 was represented by a weight of 1 kilogram which was dropped from an altitude of 40 centimeters upon the above described barium titanate pill which was protected by a steel disc of equal size. The electrical energy produced by the impact energy of .4 mkg. amounted to 2.5 mws. The sparkover voltage of the spark gap device 2 was 2.8 kv. By taking an oscillogram of the voltage input at the detonator 3 it was established that the rise of this voltage occurred during a period of time amounting to 2 $\mu$s. and after this interval the detonator 3 was ignited. The detonator device had an internal resistance of .5 ohm.

The actual resistance of the detonator 3 determines the corresponding desirable transformation ratio of the transformer 5 whereby the optimal relation between the detonator 3 and the energy generator tablet 1 is obtained. In the above described experiment a transformer having a ferrite core and a transformation ratio of 50:1 has been used. The ohmic resistance of the primary winding 5' was about 100 ohms.

The prestressing of the piezoelectric tablet 1 was in the above experiment only of the order of several grams but there may be cases when the prestressing should be several kilograms. It can be seen that the arrangements according to the invention are extremely simple, hardly subject to failure even under rough handling, and require very little space. The individual components or elements can be constructed to be very small yet sturdy so that the entire arrangement including the generator and detonator require only a few cubic centimeters. For instance, it is easily possible to reduce the size of the spark gap device to about ¼ inch and the size of the transformer to about 1 cm.$^3$ in which case still voltages up to 3 kv. and energies up to 10 mws. can be produced reliably and transformed and applied. The spark gap device is preferably of the low pressure type and its filling is preferably argon. As far as the impulse transformer 5 is concerned it is advisable to use a transformer having a closed ferrite core e.g. having a cup or shell shape and consisting of a ferromagnetic non-metallic material in which case "non-metallic" only means that no free or pure metal is contained in the core while of course metal compounds like metal oxides may be contained therein. Cores of this type are conventionally known.

It will be appreciated that in addition to the small space requirements and rugged quality of the arrangement according to the invention, a further advantage consists in the fact that the detonator is ignited without the use of mechanically operable switches or switch devices, at the very moment of the predetermined amount of voltage increase. Moreover, the igniting voltage is only produced at the very moment of the impact of the projectile on a target or other object. Consequently, the entire electrical circuit is entirely inactive during the entire time of the flight or trajectory of the projectile.

It will be understood that each of the elements described above, or two or more together, may also find a useful application in other types of detonator arrangement differing from the types described above.

While the invention has been illustrated and described as embodied in detonator arrangement comprising piezoelectric means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a detonator arrangement responsive to the impact of a moving mass, in combination, piezoelectric means having two terminals and responding to impact of a moving mass by generating a charge of high voltage available at said terminals in response to such impact; low-resistance electroresponsive detonator means ignitable by a current of predetermined amperage; and circuit means connected between said terminals of said piezoelectric means and said detonator means and including impulse control means deriving from said high voltage charge a comparatively brief electrical impulse of low amperage and comprising transformer means for stepping down said high voltage and for accordingly increasing said low amperage of said impulse derived from said charge to said predetermined amperage sufficient to cause said detonator means to ignite.

2. In a detonator arrangement responsive to the impact of a moving mass, in combination, piezoelectric means having two terminals and responding to impact of a moving mass by generating a charge of high voltage available at said terminals in response to such impact; low-resistance electroresponsive detonator means ignitable by a current of predetermined amperage; and circuit means connected between said terminals of said piezoelectric means and said detonator means and including impulse control means deriving from said high voltage charge a comparatively brief electrical impulse of low amperage and comprising transformer means having a high-resistance primary winding for stepping down said high voltage and for accordingly increasing said low amperage of said impulse derived from said charge to said predetermined amperage sufficient to cause said detonator means to ignite.

3. In a detonator arrangement responsive to the impact of a moving mass, in combination, piezoelectric means having two terminals and responding to impact of a moving mass by generating a charge of high voltage available at said terminals in response to such impact; low-resistance electroresponsive detonator means ignitable by a current of predetermined amperage; and circuit means connected between said terminals of said piezoelectric means and said detonator means and including impulse control means deriving from said high voltage charge a comparatively brief electrical impulse of low amperage and comprising spark gap means having a predetermined characteristic sparkover voltage for releasing said charge in the form of said impulse only after said charge has reached at least said sparkover voltage, and transformer means having a high-resistance primary winding in series with said spark gap means for stepping down said high voltage, and a secondary winding in series with said detonator means for applying thereto a correspondingly increased amperage.

4. An arrangement as claimed in claim 1, including mechanical means for subjecting said piezoelectric means to a predetermined amount of prestressing for pre-adjusting the sensitivity of said piezoelectric means to the impact of said mass.

5. An arrangement as claimed in claim 2, including mechanical means for subjecting said piezoelectric means to a predetermined amount of prestressing for pre-adjusting the sensitivity of said piezoelectric means to the impact of said mass.

6. An arrangement as claimed in claim 3, including mechanical means for subjecting said piezoelectric means to a predetermined amount of prestressing for pre-adjusting the sensitivity of said piezoelectric means to the impact of said mass.

References Cited in the file of this patent
UNITED STATES PATENTS

| | | |
|---|---|---|
| 2,454,264 | Stigter | Nov. 16, 1948 |
| 2,514,359 | Allison | July 11, 1950 |
| 2,623,921 | Smits | Dec. 30, 1952 |
| 2,764,091 | Hudson et al. | Sept. 25, 1956 |
| 2,991,716 | Israel et al. | July 11, 1961 |